Nov. 23, 1965  P. E. KROUSE ETAL  3,219,487
PERFORATED CONTACT MEMBER FOR VOLTAIC CELL ELECTRODES
Filed June 6, 1962
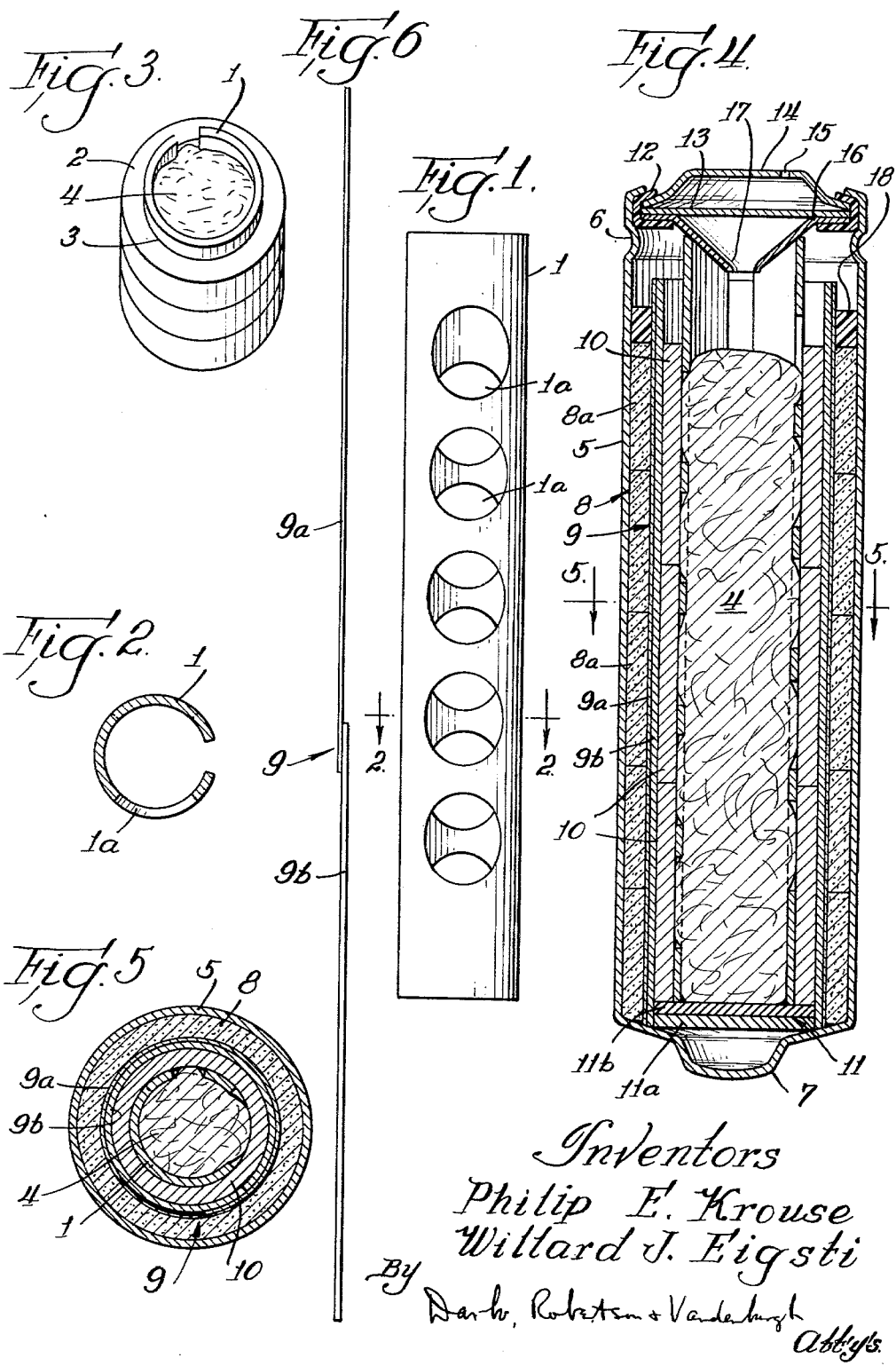
Inventors
Philip E. Krouse
Willard J. Eigsti
By Dark, Robertson & Vandenbergh
Att'ys.

United States Patent Office 3,219,487
Patented Nov. 23, 1965

3,219,487
PERFORATED CONTACT MEMBER FOR
VOLTAIC CELL ELECTRODES
Philip E. Krouse, Cleveland, Ohio, and Willard J. Eigsti, Freeport, Ill., assignors to Servel, Inc., Evansville, Ind., a corporation of Delaware
Filed June 6, 1962, Ser. No. 200,906
5 Claims. (Cl. 136—107)

This invention relates to voltaic cells and especially to those having tubular anodes, and more particularly refers to a novel means for providing electrical connection between the anode and the negative terminal of the cell, and means for storing the cell electrolyte in the central portion of the cell until it is needed.

Cylindrically shaped voltaic cells in which the anode and depolarizer member of each cell are coaxially arranged and wherein the anode is centrally located have been found to be especially well adapted for use with alkaline electrolytes.

Such a structure permits efficient utilization of the active cell elements, and lends itself to simple and efficient mass production methods of construction. In a coaxially arranged cell, the cathode or depolarizer member is arranged in the form of a tube the outer surface of which is in contact with the wall of the cell enclosure. Such a structure provides excellent electrical connection between the cell enclosure, which serves as the positive terminal, and the cathode. Electrical connection between the anode and the negative terminal, however, is generally provided by positioning the anode so that one end thereof is in physical contact with the negative terminal. Where the end of the anode and the cathode are maintained at the same level, the abnormally large amount of electrochemical action taking place at that level consumes the end of the anode at a more rapid rate than the middle portion, causing the connection between the negative terminal and the anode to become defective after only a short period of operation. Prior attempts to avoid this difficulty have mainly utilized the expediency of maintaining the contact end of the anode at a level considerably higher than that of the corresponding end of the cathode. This arrangement has ben effective to some degree, but has required that the anode contain an amount of active material considerably greater than that which is electrochemically equivalent to the depolarizer member, resulting in a material increase in the cost of the cells.

Other problems have attended the use of cylindrical anodes. In order to provide long life for the cell, it is necessary to provide a relatively large amount of electrolyte. However, if the electrolyte-absorbent separator layer is made sufficiently large to contain the desired amount of electrolyte, the distance between the anode and the cathode becomes so great that the internal resistance of the cell is increased and the current discharge capacity is diminished appreciably. Additionally leakage problems are introduced.

It is an object of the invention to provide a novel means for making electrical connection betwen the anode and the negative terminal of a coaxially arranged voltaic cell.

It is a further object to provide a means for making electrical connection between the anode and the negative terminal of a voltaic primary cell which is conservative of space and permits sufficient space for storing the cell electrolyte.

It is still further an object to provide a cell structure wherein the anode and depolarizer member are closely positioned, but yet which provide ample space for the storage of a relatively large amount of electrolyte.

Other objects and advantages of the present invention will become apparent from the following discussion and from the drawing in which:

FIG. 1 is an elevational view of a perforated contact member according to the invention.

FIG. 2 is a cross-section taken at the line 2—2 of FIG. 1.

FIG. 3 is a perspective view of a portion of an anode, contact member, and electrolyte-retaining bibulous material sub-assembly.

FIG. 4 is a cross-section of a voltaic cell incorporating the invention.

FIG. 5 is a cross-section taken at the line 5—5 of FIG. 4; and

FIG. 6 is a cross-section of an electrolyte-permeable barrier member.

According to the invention, a contact member in the form of a thin-walled split tube perforated over a substantial portion of its area is positioned inside a tubular anode fabricated from a powdered anodic metal. The tubular anode is in turn coaxially positioned within a tubular depolarizer member and separated therefrom only by a thin separator or barrier. An electrolyte reservoir is formed by placing a bibulous material tightly packed into the central channel of the tubular contact member. The contact member is then placed in the cell within the anode. When the electrolyte is added, the bibulous material swell sufficiently to cause the thin wall of the contact member to be pressed tightly against the inner surface of the anode tube. Additionally, portions of the bibulous material are forced to protrude through the perforations of the contact member wall and make contact with the inner surface of the anode tube, thus enabling electrolyte to be transferred to the remaining cell elements. The inner channel of the contact member is made sufficiently large so that it will retain therein sufficient bibulous material to contain the major proportion of the cell electrolyte.

Referring to the drawing, FIGS. 1 and 2 show a contact member 1 according to the invention in the form of a tube split along one side and having a plurality of perforations 1a over a substantial portion of its surface. In FIG. 3 the tube 1 is shown arranged within a tubular anode 2, engaging the inner surface 3 of the anode. Arranged within the contact member is an electrolyte reservoir 4 comprised of a bibulous material which is forced into the interior of the contact member with sufficient force so that, when the electrolyte is added to the bibulous material, the material swells and causes the contact member to expand outwardly radially and to become biased against the inner surface of the anode with sufficient force so that good electrical contact is established along the entire inner surface of the anode. A portion of the bibulous material is additionally caused to expand and protrude through the perforations of the contact member tube and establish contact engagement with the zinc anode surface, which it supplies with electrolyte.

In FIG. 4 the cell container is shown in the form of a cylindrical can 5 having a circular bead 6 provided near one end for supporting the closure structure. The container is provided with a dome 7 at the other end to simulate the shape of the positive carbon rod-containing end of traditional cells.

Positioned in electrical contact engagement with the container 5 is a cylindrical depolarizer member or cathode 8. To promote ease of assembly, the cathode may be formed from a plurality of separately molded sleeve segments 8a which may be individually inserted into the container.

A thin barrier membrane 9 is positioned between the inner surface of the tubular cathode or depolarizer member 8 and the anode 10. Although the barrier membrane 9 may comprise only a thin sheet of a material such as parchment, as shown in the drawing it is comprised of dual layers 9a and 9b. The barrier member as shown in FIG. 6 is prepared by cementing the end of a thin parchment strip 9a to a thin sheet 9b of a bibulous material such as webril. The length of the two strips are so chosen that the entire barrier member when wound over the anode comprises only a single layer of the parchment 9a and a single layer of the webril 9b.

The anode 10 is preferably comprised of a powdered anodic metal molded under pressure into a tube. Here also, as in the case of the cathode, the anode may comprise a plurality of short tubular segments 10a.

Contained within the axial chamber of the anode 10 is the contact member 1. The contact member is in the form of a split tube fabricated from thin perforated sheet metal. It may be fabricated from any electrically conductive metal which is not adversely affected by the cell electrolyte. In the case of an alkaline cell, brass or steel are suitable materials. The wall of the tube should be thin in order to conserve space within the cell and to permit the contact member to be expanded easily. Contained within the inner channel contact member is the electrolyte reservoir 4 composed of a bibulous material such as webril. The bibulous material within the contact member holds the major portion of the cell electrolyte. The material is forced into the contact member while dry with sufficient tamping or ramming force so that, when the electrolyte is added, the material swells and applies a radially outward force against the inner wall of the contact member, sufficient to cause it to expand and engage and make good contact wiith the inner surface of the anode. Additionally a portion of the bibulous material protrudes through the perforations of the contact member and makes contact with the inner surface of the anode. This permits the electrolyte to be transferred to the anode as needed.

The electrolyte not contained within the centrally located bibulous material is largely held within the barrier, either in the single parchment form or in the double layer form as shown in FIG. 4.

An electrically non-conductive resilient supporting disc 11 composed of a material such a neoprene is positioned at the bottom of the container to prevent the contact member 1 from shorting out against the container 5. When the bottom of the container is domed as designated by the numeral 7, it is desirable to use a dual layer disc having a more rigid supporting layer 11a and a more resilient upper layer 11b. The resilience of the disc 11 provides an axial biasing force against the contact member 1, maintaining it in good electrical contact with the negative terminal assembly.

Although a variety of cell closure and terminal assemblies known in the art may be utilized, a self-venting type is shown in the drawings. This structure is disclosed and claimed in co-pending application Serial No. 163,243 for Diaphragm Valve for Venting Fluid of Joseph J. Coleman, Milton E. Wilke and Clifford J. Vander Yacht, filed December 29, 1961, now Patent No. 3,143,441. As disclosed therein, and as is shown in FIG. 4, the closure structure comprises a sealing gasket 12 in the form of a flanged washer composed of a resilient material such as nylon or neoprene placed in the end of the container above the bead 6. Within the sealing gasket is contained a resilient valve diaphragm 13 composed of material such as spring steel, a rigid terminal cap 14 having a venting aperture 15 at its upper surface, and a rigid contact disc 16. The terminal cap 14 is composed of a substantially rigid material such as sheet steel. The periphery of the cap 14 is in contact engagement with the periphery of the diaphragm 13 and is of substantially the same diameter. The central portion of the cap 14 is domed externally away from the diaphragm to permit the central portion of the diaphragm to bow into the space therebetween without encountering resistance. The contact disc 16 makes electrical contact with the periphery of the diaphragm 13, and, by means of a central portion protruding downward, provides electrical connection with the contact member. A venting aperture 17 is provided to permit gases to enter the space enclosed between the contact discs 16 and the diaphragm 13. The sealing gasket 12 is compressed radially between the edge of the diaphragm and the adjacent portion of the wall of the steel can.

The material used as the active ingredient of the cathode or depolarizer member 8 may be any of the easily reducible metal oxides commonly used in the battery art, such as manganese dioxide, mercuric oxide, silver oxide, copper oxide or an oxide or hydroxide of nickel. When relatively non-conductive materials are used, as for example manganese dioxide or mercuric oxide, a minor proportion of a conductive material such as graphite or a carbon black such as acetylene black must be added in order to increase the conductivity of the depolarizing mixture. Silver oxide is generally in itself sufficiently conductive so that additional conductive materials need not be added. Suitable depolarizer compositions may be prepared by mixing together about nine parts manganese dioxide and about one part finely divided graphite, or about ten parts mercuric oxide and one part graphite. In the case of the nickel-cadmium cell, powdered metallic nickel may be added to the oxide in order to increase conductivity. The depolarizer mixture is preferably molded under pressure to the desired form. Where a tubular cathode is to be utilized, it has been found convenient to mold the cathode in the form of a plurality of tubes which are individually inserted, as shown in the drawing. The outer diameter of the depolarizer tubes should be so chosen that a tight press fit will result when they are inserted into the container 5, so that good electrical contact between the cathode and the container will result.

The function of the barrier member 9 is to prevent depolarizer particles from migrating to the central portion of the cell and thereby causing a short circuit. It must be composed of a material which is sufficiently resistant to the electrolyte so that it will not be decomposed, and yet must be sufficiently permeable so that the electrolyte may pass freely therethrough. Suitable barrier materials are parchment paper, sodium carboxymethylcellulose, porous polymeric films of a material such as vinyl chloride, and other suitable barrier materials which are known to the art.

The bibulous electrolyte absorbent reservoir 4 may be composed of any electrolyte-absorbent material which is not adversely affected by the electrolyte. A suitable material is webril, a non-woven fabric made by blending thermoplastic fibers into a cotton web and applying heat and pressure.

The electrolyte may be chosen from among any of those suitable for the particular electrochemical system used. A preferred alkaline electrolyte has the following composition:

| | Percent |
|---|---|
| KOH | 28 |
| ZnO | 6 |
| $H_2O$ | 66 |

The zinc oxide component is utilized only where the anode is comprised of zinc. Its function is that of an inhibiting agent to protect the zinc anode from excessive dissolution in the electrolyte especially during the period when no current is being drawn from the cell. Instead of being initially dissolved in the electrolyte, the zinc oxide may be incorporated in dry form in the bibulous material. When the electrolyte is then added to the bibulous material, a portion of the zinc oxide dissolves into the electrolyte.

The anode is composed of an electronegative metal. In the mercury, manganese dioxide, and silver cells, zinc is the preferred anodic metal. The anode may be fabricated by placing the metal in the form of amalgamated powder into molds of a desired size and shape, and molding the structure under pressure. In the case of a nickel-cadmium cell, the anode is comprised of powdered cadmium or, alternatively, cadmium oxide when the cell is assembled in the discharged state.

In assembling the cell, the depolarizer cathode tubes are pressed into place in the can. The barrier membrane is then wound into a tube and placed inside the depolarizer tube. The insulating disc 11 is then inserted in the bottom of the container. The tubular anode, either in the form of a single tube or individual segments, is then inserted inside the barrier tube. The bibulous material forming the electrolyte reservoir is then tamped or rammed tightly into the contact member tube while still dry. The contact member is inserted inside the tubular anode. The requisite amount of cell electrolyte is then added to the bibulous material contained within the contact member tube, causing the tube to expand and press tightly against the inner wall of the anode 10. A portion of the bibulous material is also forced through the perforations 1a of the contact member 1 and makes contact with the anode 10, providing the anode with a source of electrolyte as it is needed.

Closure and sealing of the cell are accomplished by first inserting a barrier washer 18. The nylon gasket 12, the contact disc 16, the diaphragm 13 and the metal cap 14 are then inserted into the enlarged portion of the container opening. The upper lip of the container is rolled over to retain the closure members, and the container is finally drawn through a hole in a forming tool having a diameter only sufficiently great to permit the unflared portion of the container to pass freely therethrough. As the entire container is forced through the hole, the flared portion is compressed radially inward with sufficient clamping force to provide a tight seal between the container 5, the sealing gasket 12 and the diaphragm 13. The closure structure is retained between the rolled over lip of the container and the circular groove or bead which results when the flange is drawn through the hole of the forming tool.

The closure as described accomplishes two purposes. First, it provides a hermetic seal under normal operation. Second, it provides a means for relieving the cell of excess gas pressure which may form under certain abnormal operating conditions. After the release of excess gas has taken place, the hermetic seal is again established.

Two groups of manganese dioxide cells utilizing an alkaline electrolyte were prepared for testing. The size chosen was that commonly known as the "pen light" or No. 9 cell. The cells were prepared according to the darwings and utilizing the active ingredient formulas described above. The first group of cells was tested while the cells were fresh. The test comprised the standard test for open circuit voltage, and short circuit current discharge. The cells were then tested to determine the operating life under a standard load. This comprises placing a four ohm resistance across the terminals of each cell, and periodically measuring the voltage under load conditions until the cell has discharged to an end-point voltage of 0.90 volt. In the first group all tests were performed while the cells were fresh. A second group was placed in storage for one month and then tested in the same manner as the first group. The test data for both groups are reproduced below:

*Fresh cells*

| Volts (Open circuit) | Amperes (Short circuit) | Capacity in minutes |
|---|---|---|
| 1.52 | 10.5 | 186 |
| 1.53 | 9.0 | 184 |
| 1.53 | 8.0 | 177 |
| 1.53 | 8.0 | 175 |
| 1.53 | 7.0 | 180 |

*After one month storage*

| Volts (Open circuit) | Amperes (Short circuit) | Capacity in minutes |
|---|---|---|
| 1.50 | 8.8 | 180 |
| 1.50 | 7.2 | 205 |
| 1.50 | 7.8 | 165 |
| 1.46 | 7.9 | 203 |
| 1.49 | 7.5 | 175 |

The test results show that all the cells, including those placed under one month storage, performed excellently.

The cell according to the invention has many advantages over prior art cells of similar structure. Replacement of the major proportion of electrolyte located centrally within the anode permits the outer surface of the anode to be positioned very close to the cathode. This arrangement appreciably reduces the internal resistance of the cell because of the reduced inter-electrode distance, and additionally because the outer surface area of the anode is greater, since it has a greater diameter than prior art anodes. Further, because the outer diameter of the anode tube is larger, the anode may be made thinner, while still retaining the required amount of anode material. The increased inner diameter of the anode and consequently increased outer diameter of the contact member results in a greater contact surface area. Because the contact member does not depend upon its own resilience to provide radial contact force against the anode, but because this function is accomplished by the expanding bibulous material, the contact member may be made extremely thin in order to conserve inner cell space. The perforations provided in the contact member permit the bibulous material contained within the contact member to protrude therethrough and make good contact with the inner surface of the anode so that electrolyte can be transferred to the outer portion of the cell. The result is a cell which is readily adaptable to mass production techniques, and which provides excellent efficiency and extended operating life.

Although the invention has been described in detail in relation to only relatively few specific embodiments, it is to be understood that many variations may be practiced by those skilled in the art without departing from the spirit or scope thereof, within the limits defined by the appended claims.

Invention is claimed as follows:

1. A voltaic cell comprising an enclosure, positive and negative terminals, a tubular depolarizer member contained within said enclosure, a tubular metallic anode coaxially arranged within said depolarizer member, a thin electrolyte-permeable barrier interposed between said anode and said depolarizer member, a thin-walled metallic tubular contact member split along one side and perforated over a substantial portion of its area coaxially arranged within said anode in electrical contact engagement therewith, one end of said contact member being electrically connected to said negative terminal, an electrolyte impregnated initially swellable bibulous material filling the space within said contact member, said bibulous material being under pressure due to swelling by absorption of electrolyte whereby to provide a radial contact force biasing said contact member outwardly against the inner surface of said anode.

2. A voltaic cell according to claim 1 wherein a portion of said bibulous material protrudes through the perforations in the wall of said contact member and makes contact engagement with said anode.

3. A voltaic cell according to claim 1 wherein said bibulous material comprises a non-woven cellulose fabric.

4. A voltaic cell according to claim 1 wherein said anode is comprised of compressed zinc powder.

5. A method of assemblying an anode-contact member-electrolyte reservoir sub-assembly for a voltaic cell which comprises filling the central channel of a radially expandable contact member with a swellable bibulous material, inserting the filled contact member into the central channel of a tubular anode, and adding an electrolyte to said bibulous material to swell it sufficiently so that said contact member is expanded and biased tightly against the inner wall of said anode, said contact member comprising a thin-walled metallic tube split along one side and perforated over a substantial portion of its area.

References Cited by the Examiner

UNITED STATES PATENTS

| | | | |
|---|---|---|---|
| 1,510,617 | 10/1924 | Vare | 136—16.2 |
| 2,463,316 | 3/1949 | Ruben | 136—107 |
| 2,993,947 | 7/1961 | Leger | 136—128 |
| 3,069,485 | 12/1962 | Winger et al. | 136—107 |
| 3,116,172 | 12/1963 | Wilke et al. | 136—107 |

FOREIGN PATENTS 642,289  6/1962  Canada.

JOHN H. MACK, *Primary Examiner.*